Aug. 4, 1942.    A. C. HANSON ET AL    2,291,623
OSCILLATING JOINT FOR TRACK SHOES
Filed Oct. 30, 1940
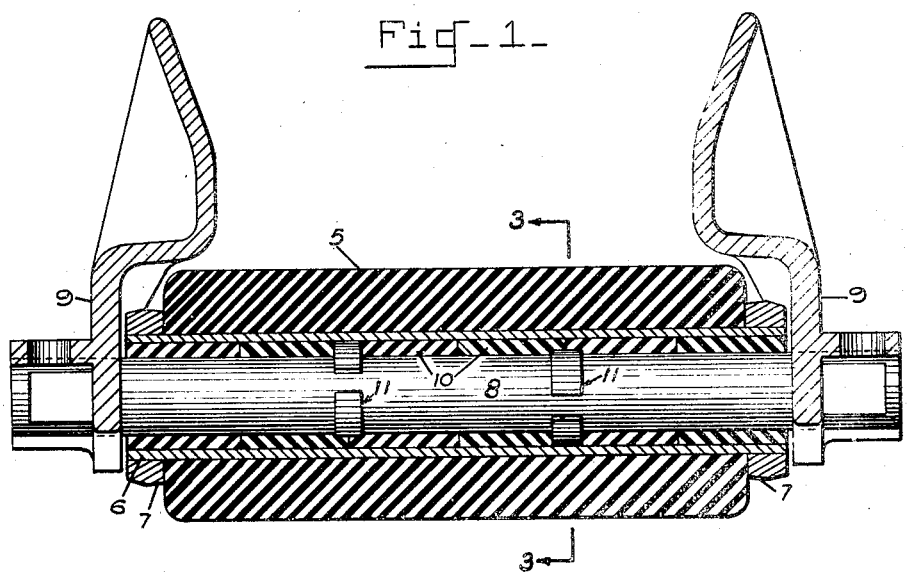
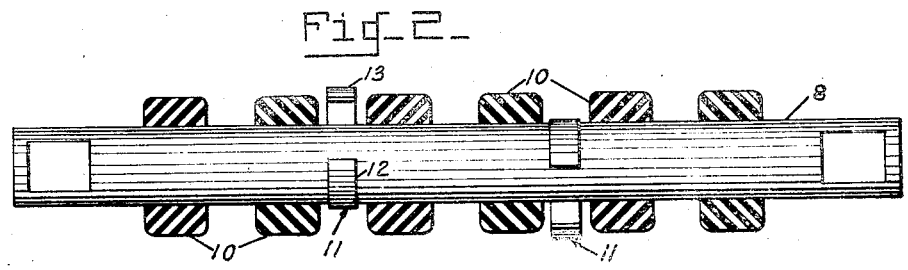
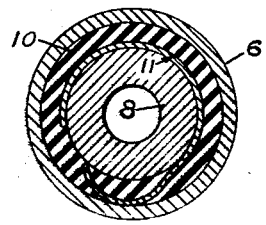 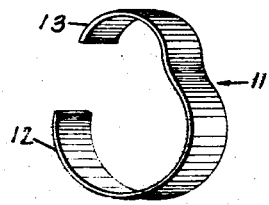
INVENTORS
Arthur C. Hanson
Richard M. Howlett Patented Aug. 4, 1942

2,291,623

UNITED STATES PATENT OFFICE 2,291,623

OSCILLATING JOINT FOR TRACK SHOES

Arthur C. Hanson, Davenport, Iowa, and Richard M. Howlett, Elizabeth, N. J.

Application October 30, 1940, Serial No. 363,460

7 Claims. (Cl. 173—324)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to oscillating joints such as are used in chains and tracks for track-laying vehicles.

Frictionless joints are formed by interposing between spaced concentric joint members an intermediate elastic member of rubber or rubber-like material which is secured to the joint members and functions through its distortion to permit relative movement of the joint members.

In U. S. Patent 2,049,024 of July 28, 1936, there is shown a joint of this character in which the inner member of the joint carries a plurality of normally spaced rubber rings which during assembly to the outer joint member are placed under radial compression and distorted in axial directions whereby they substantially fill the spaces therebetween.

The purpose of this invention is to take advantage of this type of construction in order to include in the joint a contact member for conducting charges of electricity and preventing accumulation thereof.

The specific nature of the invention as well as other objects and advantages thereof will clearly appear from a description of a preferred embodiment as shown in the accompanying drawing in which:

Fig. 1 is a longitudinal sectional view through a joint constructed in accordance with the invention;

Fig. 2 is a detail view of the inner member showing the arrangement of the rubber rings and the contact members prior to assembly of the joint members;

Fig. 3 is a sectional view taken generally on the line 3—3 of Fig. 1;

Fig. 4 is a perspective view of one of the contact members.

Referring to the drawing by characters of reference there is shown a track shoe of the type disclosed in U. S. Patent 2,129,696 and comprising a rubber block 5 which is associated with a rigid metallic frame including metallic cylinders or tubular sleeves 6, only one being shown, and connecting bars 7—7. The sleeve 6 constitutes the outer member of a joint whose inner member is formed by a rod 8 extending transversely through the sleeve and spaced therefrom. The projecting ends of the rods of adjacent track shoes are connected by links 9 as is well understood in the art.

The rod 8, prior to assembly in the joint, carries a plurality of spaced rings 10 of rubber or rubber-like material which are attached or bonded to the rod, preferably by vulcanization. The rings have a diameter in excess of the internal diameter of the sleeve so that when the rod is forced into the sleeve the rings will be radially compressed and will be distorted or displaced in axial directions into abutting relation as shown in Fig. 1.

One or more identical clips 11 of electrically conductive material are mounted on the rod between the rings and are provided for establishing contact between the rod and sleeve through the insulating layer of rubber. Each clip is in the form of an open compound ring having opposing arcuate loops or portions, one end of the larger portion 12 merging with a reduced arcuate portion 13 whose center is approximately on the extended periphery of the portion 12. As seen in Fig. 2 when the arcuate portion 12 is clamped on the rod 8 the outermost surface of the portion 13 lies slightly beyond the periphery of a rubber ring 10.

In assembling the rod in the sleeve 6 the arcuate portion 13 must be compressed in order to permit its entry into the sleeve. The material of the clip is sufficiently resilient so that the portion 13 will tend to spring back to its normal position and will thereby be firmly maintained in contact with the sleeve as clearly shown in Fig. 3. During the insertion of the rod into the sleeve the rubber rings are distorted in axial directions as previously described and the rubber engages the inner side and part of the outer side of the reduced arcuate portion 13 as well as the outer side of the larger arcuate portion 12. As a result of this engagement the clip is firmly held in place and in contact with the rod and sleeve during oscillation of the joint.

We claim:

1. An oscillating joint comprising an outer tubular sleeve, an inner member of smaller diameter within the sleeve and adapted to oscillate with respect thereto, a rubber bushing between the inner member and the sleeve, and an electrically conductive resilient clip embedded in the the rubber bushing and having a portion partially encircling the inner member and having another portion resiliently contacting the sleeve.

2. An oscillating joint comprising an outer tubular sleeve, an inner member of smaller diameter within the sleeve and adapted to oscillate with respect thereto, a rubber bushing between the inner member and the sleeve, and an electrically conductive resilient member disposed between and contacting the inner member and the sleeve, said conductive resilient member being embedded in the rubber bushing.

3. An oscillating joint comprising an outer sleeve, an inner member adapted to oscillate with respect to the sleeve, a plurality of rubber rings on the inner member and normally spaced when unassembled but extended axially and under radial compression when assembled in the sleeve, and an electrically conductive resilient clip disposed between spaced rings, said clip having an arcuate portion mounted on the inner member and an opposed arcuate portion resiliently contacting the sleeve, said rubber rings extending a sufficient distance in their axial direction when assembled whereby said spaced rings embed the clip.

4. An oscillating joint comprising an outer sleeve, an inner member adapted to oscillate with respect to the sleeve, a plurality of rubber rings on the inner member and normally spaced when unassembled but extended axially and under radial compression when assembled in the sleeve, and an electrically conductive resilient clip disposed between spaced rings, said clip having an arcuate portion mounted on the inner member and an arcuate portion resiliently contacting the sleeve.

5. An electrically conductive clip for electrically bonding two concentric oscillatable members comprising an open compound ring having a main arcuate portion with one end merging with a reduced arcuate portion whose center is approximately on the extended periphery of the main arcuate portion, said main arcuate portion having its inner side adapted to resiliently engage the inner concentric member and said reduced arcuate portion having its outer side adapted to resiliently engage the outer concentric member.

6. In an oscillating joint comprising an outer sleeve, an inner member adapted to oscillate with respect to the sleeve, a rubber bushing inserted between the outer sleeve and the inner member and providing sole means for holding the sleeve and inner member in spaced relationship, and a resilient metallic clip embedded in the rubber bushing and providing a resilient connection between the inner member and the outer sleeve.

7. In an oscillating joint the combination of an outer sleeve, an inner member, resilient, electrically non-conductive, charge forming material disposed between and in contact with the outer sleeve and the inner member, and a resilient electrically conductive element held by the resilient material and providing a resilient connection between the inner member and outer sleeve.

ARTHUR C. HANSON.
RICHARD M. HOWLETT.